Dec. 1, 1959 J. W. BARKLEY 2,915,357

MAGNETIC TAPE APPARATUS

Filed Jan. 24, 1955 5 Sheets-Sheet 1

INVENTOR.
JOSEPH W. BARKLEY

BY Flehr & Swain

ATTORNEYS

Dec. 1, 1959 J. W. BARKLEY 2,915,357

MAGNETIC TAPE APPARATUS

Filed Jan. 24, 1955 5 Sheets-Sheet 2

INVENTOR.
JOSEPH W. BARKLEY

BY Flehr & Swain

ATTORNEYS

INVENTOR.
JOSEPH W. BARKLEY
BY
Flehr and Swain
ATTORNEYS

Dec. 1, 1959 J. W. BARKLEY 2,915,357

MAGNETIC TAPE APPARATUS

Filed Jan. 24, 1955 5 Sheets-Sheet 4

INVENTOR.
JOSEPH W. BARKLEY

BY Fleher and Swain

ATTORNEYS

INVENTOR.
JOSEPH W. BARKLEY
BY Flehr and Swain
ATTORNEYS

United States Patent Office 2,915,357

Patented Dec. 1, 1959

2,915,357

MAGNETIC TAPE APPARATUS

Joseph W. Barkley, Redwood City, Calif., assignor to Ampex Corporation, Redwood City, Calif., a corporation of California Application January 24, 1955, Serial No. 483,786

3 Claims. (Cl. 346—74)

This invention relates generally to magnetic tape apparatus suitable for use as a transient recorder. It has particular use in seismic geophysical exploration or test operations as described herein.

Seismic methods for geophysical exploration have been widely used in the petroleum and gas industries for locating oil and gas-bearing strata. The equipment generally used consists of "Geophones" or like vibration detecting devices which are placed at various points on the earth's surface, and which pick up seismic vibrations resulting from a transient or other disturbance of the electric media under investigation. It is desirable to separately record the current variations from the several "Geophones" and to utilize such records for subsequent analysis. Conventional tape recorders having the usual supply and take-up reels, with provision for multi-channel recording, can be used for this purpose. However, such equipment lacks the adaptability and operating characteristics desired. For example, it is not convenient to have a series of such records upon a continuous tape. Also the usual methods employed for magnetic tape recording are impractical when applied to the recording of low frequencies such as are received from the "Geophones."

In general it is an object of the present invention to provide magnetic tape equipment which makes use of relatively short magnetic tape strips, as distinguished from a long continuous tape.

Another object of the invention is to provide apparatus of the above character having a rotating drum for accommodating a short strip of magnetic tape material, together with novel means for locating and retaining the strip and for driving the drum during recording and reproducing operations.

Another object of the invention is to provide geophysical recording apparatus which effectively records the relatively low frequencies received from detecting devices of the "Geophone" type.

Additional objects and features of the invention will appear from the following description in which the preferred embodiment has been set forth in detail in conjunction with the accompanying drawing.

Referring to the drawing.

In general the present invention makes use of a rotatable drum having a peripheral surface about which a strip of magnetic tape material can be wrapped. The drum carries novel means for engaging the end portions of the strip, whereby the strip is properly located and is maintained under tension. Motive means is provided for driving the drum at a constant speed during recording and reproducing operations, and during its rotation the strip is engaged by a magnetic head assembly. A portion of the drum is accessible to an opening or window in the front panel of the apparatus, thereby facilitating the application and removal of strips.

Figure 1:
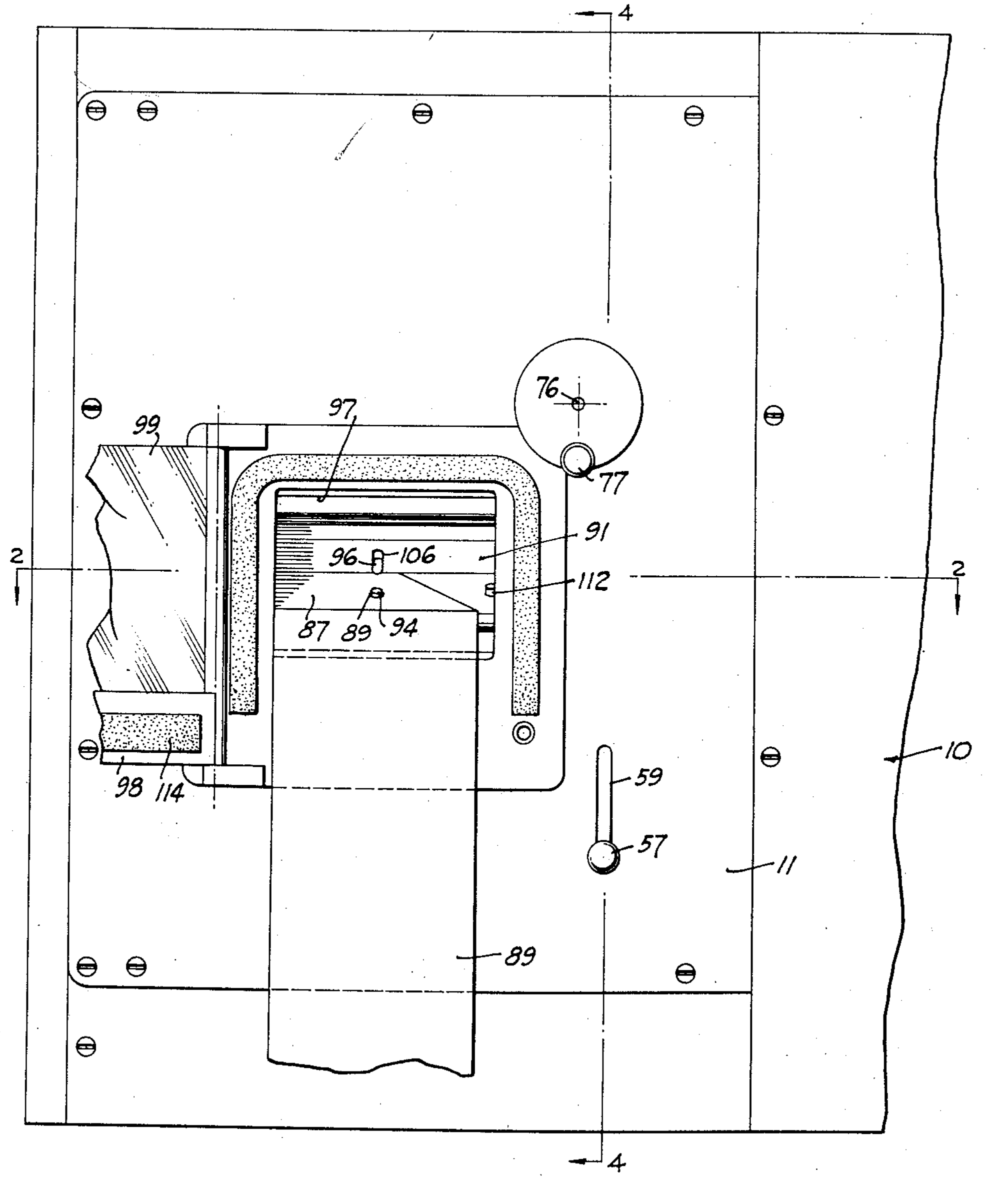
Figure 1 is a front view of apparatus incorporating the present invention, and in particular illustrating the manner in which a magnetic strip can be applied.
Figures 2, 3, 11:
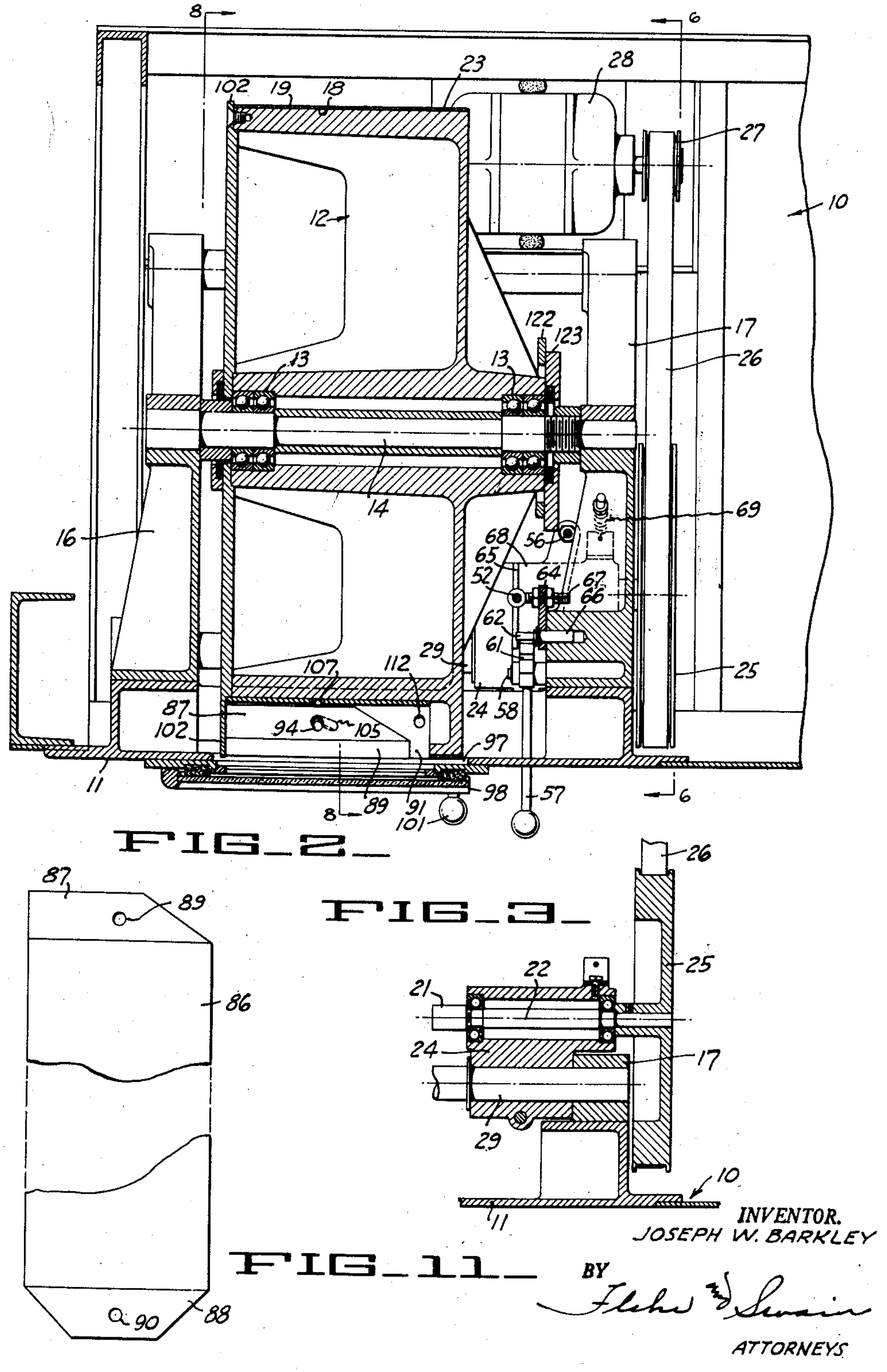
Figure 2 is a plan view in section, taken along the line 2—2 of Figure 1.
Figure 3 is a detail illustrating a part of the drive means for the drum.
Figure 11 is a view illustrating a magnetic strip of the type suitable for use with the apparatus.
Figure 8:
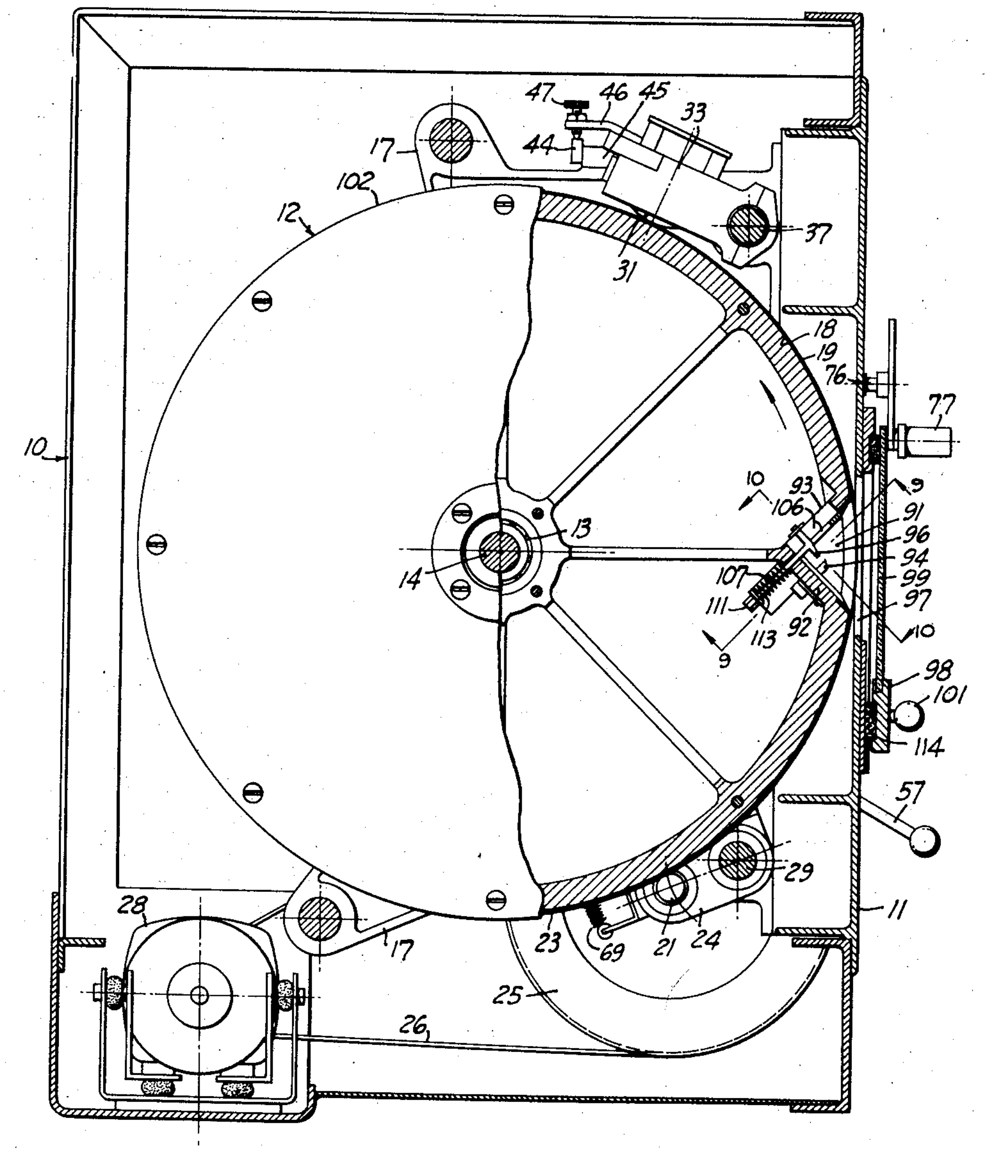
Figure 8 is a side elevational view, partly in cross-section, and illustrating the drum position for the application or removal of the magnetic tape strip.

As shown in Figures 1, 2 and 8, the apparatus consists of a housing 10 having a front panel 11. A drum 12 is disposed within the housing and is rotatably carried by the bearing assemblies 13 on the horizontal shaft 14. Brackets 16 and 17 form a part of the frame of the housing and serve to support the shaft.

The cylindrical periphery of the drum is preferably provided with a surfacing layer 18 of resilient material such as suitable natural or synthetic rubber. The layer 18 provides a peripheral surface 19 which is adapted to accommodate a strip of magnetic tape material.

The drive means for rotating the drum 12 preferably consists of a driving capstan 21 carried by one end of the rotatable shaft 22, and adapted to engage the margin 23 of the drum. Shaft 22 is journaled in the arm 24, and its other end carries the driving pulley 25. A belt 26 serves to connect pulley 25 to a pulley 27 carried by the electric motor 28 (Figure 2). A horizontal shaft or rod 29 is carried by the frame of the apparatus, and serves to pivotally mount the arm 24. The arrangement is such that by turning the rod or shaft 29, the arm 24 is swung between two limiting positions, in one of which the capstan is in driving relation with the drum, and in the other of which the capstan is withdrawn to non-driving position.

Figure 5:
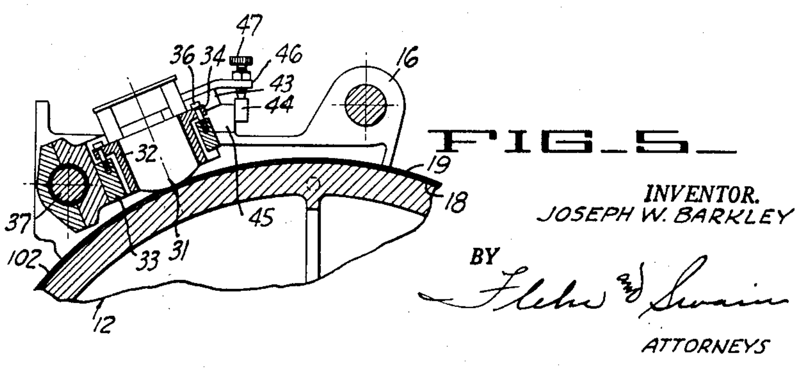
Figure 5 is an enlarged cross-sectional detail illustrating the magnetic head and the supporting means for the same.

The strip of magnetic material wrapped about the drum is adapted to be engaged by the multiple channel magnetic head 31. This head can be of conventional construction with the various magnetic units of the same provided with pole tips all arranged to contact the strip simultaneously on laterally spaced track areas. The head 31 is carried within a rectangular casing 32 that in turn is accommodated within a rectangular opening provided in the support arm 33. The flanges 34 on the casing 32 are loosely attached to the arm as by means of the screws 36, whereby the head together with the casing 32 has limited freedom of movement with respect to the arm. The arm is attached to the shaft 37, which in turn is carried by the stationary journal brackets 16 and 17. When the assembly is in the position shown in Figure 5, the head 31 is resting in engagement with a strip upon the drum. When the arm 33 is turned in a counter clockwise direction as viewed in Figure 5, the head is lifted to an out-of-the-way position with respect to the drum.

Figure 4:
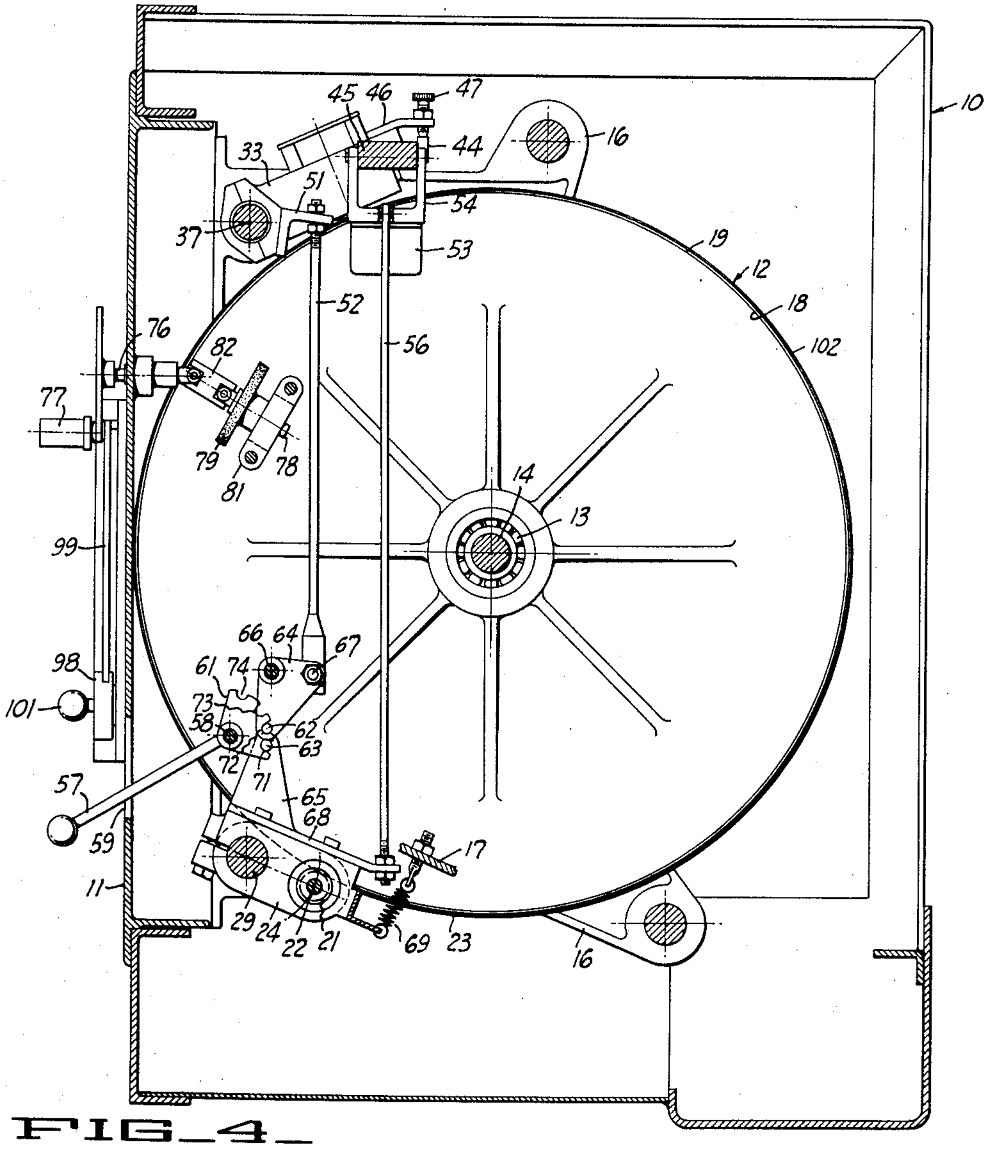
Figure 4 is a cross-sectional view taken along the line 4—4 of Figure 1.

For a purpose to be presently described I provide an electrical switch 44 of the micro-switch type, which is mounted on suitable supporting means such as the bar 45. The switch is arranged to be operated by the adjustable screw 47, which is carried by a bar 46 on the arm 33. Thus when arm 33 is swung to elevate the head, the magnetic switch is operated. As will be presently explained this micro-switch can be used to disable the playback amplifier when the magnetic head is lifted. Arm 33 is provided with a tab 51 (Figure 4) which in turn is attached to the upper end of the link rod 52. Rod 52 connects to manual operating means to be presently described.

It is desirable to provide means for braking the drum against rotation. Thus a brake pad 53 (Figure 4) is disposed adjacent one side of the drum, and is carried by the pivoted arm 54. A link-rod 56 is attached to the arm 54 and extends to operating means to be presently described.

Preferably a single manual control lever 57 (Figures 2 and 4) is connected to control operation of the driving means, the raising and lowering of the magnetic head, and the braking means for the drum. The lever is carried by the horizontal pin or shaft 58 and extends through the vertical slot 59 formed in the front panel 11. A quadrant cam 61 rotates together with the lever 57, and engages the pins 62 and 63 carried respectively by the pivoted members 64 and 65. Member 64 is carried by the stationary pin 66, and forms an operating arm which has a connection 67 with the link rod 52. In certain operating positions of the lever 57, link rod 52 is positioned to elevate the magnetic head. A member 65 in turn forms a part of the crank 68, which is carried for pivotal movement by the horizontal shaft 29. The crank 68 is connected to one end of link rod 56, the other end of which is operatively connected with the arm 54. Lever 68 is urged in a counter clockwise direction as viewed in Figure 4, by the tension spring 69. This spring serves to urge the brake pad toward released position and also urges the capstan 21 into driving relation with the drum 12.

The quadrant 61 is in the form of a cam having its periphery interrupted by a plurality of detect notches 71, 72, 73 and 74. For the three operating positions of the quadrant, representing the three operating positions for lever 57, the pins 62 and 63 rest in certain of these notches. Thus for the lowermost position of lever 57 the pins 62 and 63 rest within the notches 71 and 72, and when so positioned the magnetic head assembly is in contact with magnetic strip upon the periphery of the drum, the driving capstan is engaged with the drum to rotate the same, and the brake pad is in released or retracted position. In the uppermost position of the lever 57, the pins 62 and 63 engage respectively in the notches 74 and 73 and the location of these notches with respect to the center of the shaft 58 is such that members 64 and 65 are in position to elevate the magnetic head through movement of rod 52, to lift the same from the drum, while at the same time the arm 24 is positioned to retract the driving capstan. Also the brake pad 53 is permitted to press against the drum whereby the drum is braked against rotation. When the lever 57 is in its intermediate position, pins 62 and 63 engage notches 73 and 72 respectively. The positioning of the associated parts is now such that the driving capstan is in engagement with the drum, the magnetic head is elevated from the drum, and the brake pad is disengaged. These three operating positions for the lever 57 together with the coordinated operation of the associated parts, facilitates use of the apparatus in geophysical recording and reproducing operations, and in addition facilitates attaching and removing the record strip with respect to the drum.

In addition to the motor means for driving the drum it is desirable to provide manual drum rotating means operable from the front of the panel 11. Thus a shaft 76 is journaled in the panel 11 and turned by the connected crank 77. Within the housing there is a shaft 78 that carries a friction drive wheel 79. The journal block 81 that carries the shaft 78, is mounted on a suitable portion of the machine frame or housing. Universal drive connection 82 connects the shafts 76 and 78.

As previously mentioned a strip of magnetic tape material is employed which is wrapped about the drum. As shown in Figure 11 the strip 86 may consist of a suitable pliable material having a homogeneous coating of magnetic material on one side of the same. The end portions 87 and 88 are preferably stiffened as by attachment of one or more layers of resin impregnated sheet material. The stiffened or reinforced portions are provided with openings 89 and 90, for accommodating retaining pins.

The periphery of the drum is interrupted by a substantially V-shaped recess 91 (Figure 8). Walls 92 and 93 define the recess 91 and serve to carry the retaining pins 94 and 96. The recess 91 can be brought in registry with an access opening or window 97, formed in the front panel 11. Normally the opening 97 is covered by a hinged closure 98 or door having a transparent portion 99 through which the drum can be viewed. A suitable latch can be released by the knob 101 whereby the closure can be opened or latched closed.

Figure 10:
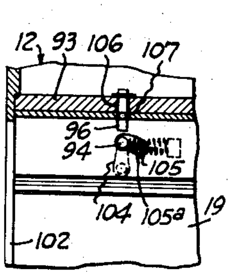
Figure 10 is a detail taken along the line 10—10 of Figure 8.

Pin 94 is movably mounted with respect to the wall 92 and is spring urged to press one edge of the magnetic strip against the shoulder formed by the flange 102, on one end edge of the drum (Figure 2). Pin 96 is likewise movably carried by the wall 92 and is spring urged to tension and tighten the magnetic strip about the drum. Thus, as illustrated in Figure 10 an arm 104 is pivotally mounted upon the wall 92, and the free end of this arm serves to mount the pin 94. A slot 105 in wall 92 accommodates movements of the pin. A suitable compression spring 105a urges the arm 104 in a counter clockwise direction as viewed in Figure 10.

Figure 9:
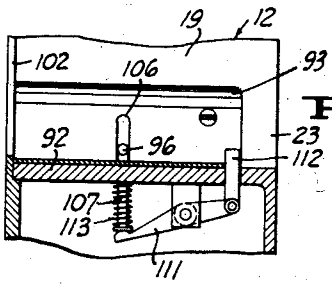
Figure 9 is a cross-sectional detail taken along the line 9—9 of Figure 8.

The pin 96 is accommodated in a slot 106 provided in the wall 93. A slidably mounted rod or plunger 107 mounts the pin 96 and has one end of the same operably associated with the fulcrumed lever 111. A manual pushbutton 112 is connected to the lever 111, and when this button is depressed the lever moves the pin 96 upwardly as viewed in Figure 9. A spring 113 urges the pin 96 downwardly as viewed in Figure 9.

Application and removal of the magnetic record strip with respect to the drum can be described as follows: The manual crank 77 is turned to bring the recess 91 in registry with the access opening 97, and the closure 98 is opened. One end of the strip, namely the upper end shown in Figure 11, is engaged with the pin 94, while this pin has been temporarily moved toward the right as viewed in Figure 1, or in other words away from the flange 102. Release of the pin 94, after its engagement with the opening 89, and while the reinforced end portion 87 is being pressed against the wall 92, results in urging one edge of the strip against the shoulder formed by the flange 102, thus accurately locating the strip with respect to the magnetic head. While attaching one end in the manner just described, the length of the strip is permitted to hang down in front of the panel in the manner illustrated in Figure 1. The door carries a felt strip 114 which is adapted to engage the coated side of the strip, when door is closed. After closing the door to frictionally engage the strip, the drum is rotated (by crank 77) whereby the tape is wound over the peripheral drum surface with its one edge in contact with the flange 102. When one revolution has been completed to register recess 91 with the opening 97, the door is opened and the button 112 pressed to bring the pin 96 to a position in which the operator may engage this pin in the opening 90 at the other end of the strip. After the operator has pressed this reinforced end of the strip against the wall 93, button 112 is released whereby tension is applied to the tape to tighten it upon the drum. Thereafter the door is closed, and the apparatus is in condition for a recording or reproducing operation.

Figures 6, 7:
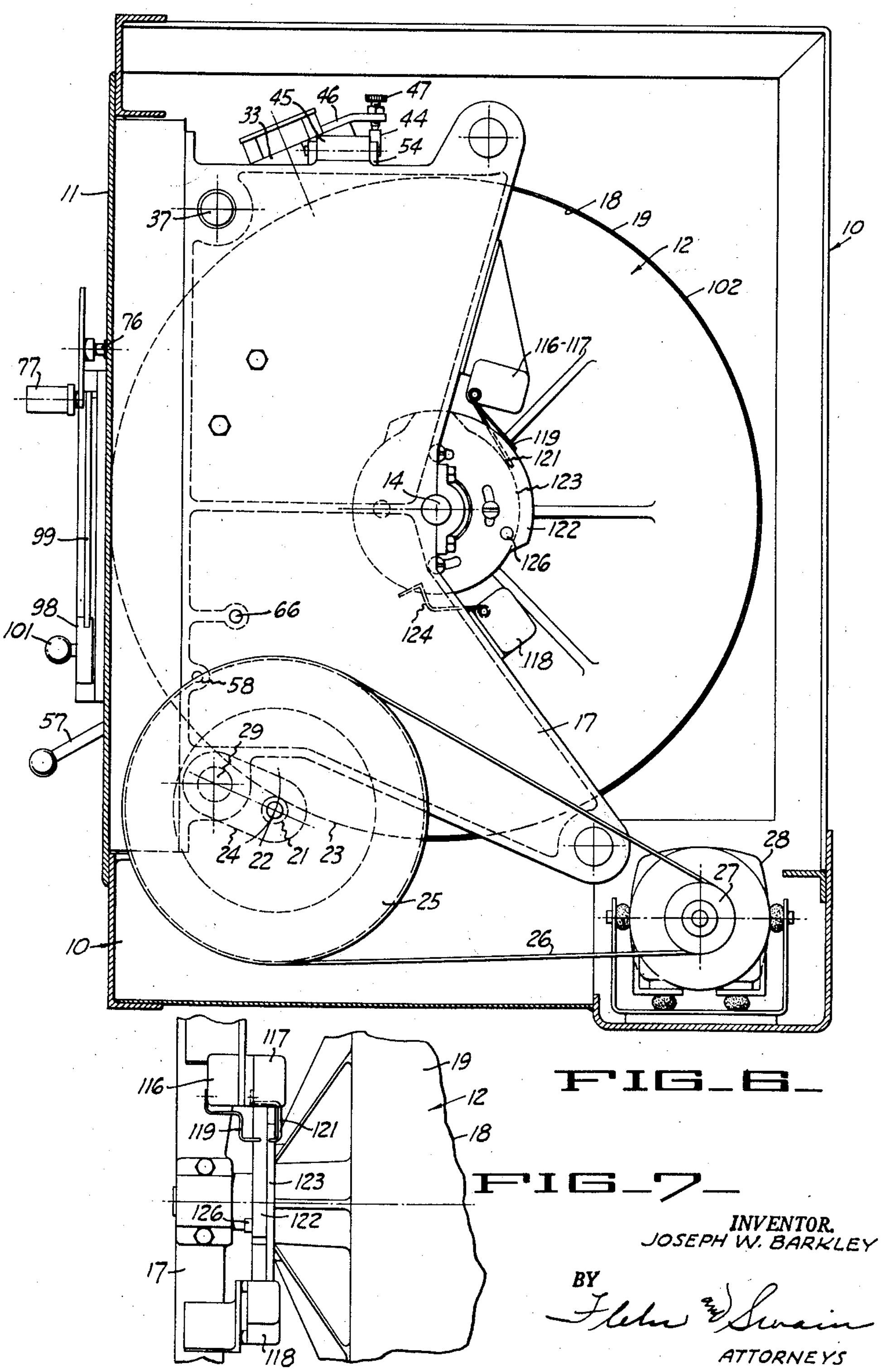
Figure 6 is a side elevational view showing the cabinet in section, and illustrating the same equipment as Figure 1.
Figure 7 is a detail illustrating certain of the switches associated with the rotating drum.

It is desirable to provide some additional features which facilitate use of the apparatus for geophysical recording and reproducing operations. The switch 44 is connected in a circuit which in turn serves to control the playback amplifiers. Thus when the magnetic head 31 is lifted free of the drum, switch 44 is operated whereby the playback amplifiers are rendered inoperative. Additional switches 116, 117 and 118 (Figure 7) are shown carried by the frame of the machine adjacent one side of the drum. The operating fingers 119 and 121 of switches 116 and 117 are operated by the cams 122 and 123 respectively which are attached to the drum. Switch 116 is connected to a circuit which cuts off the playback amplifiers when the drum is passing through a position in which the magnetic head is within the recess 91. Switch 118 has its operating finger 124 in the path of movement of the studs 126 on the cam 122. Switch 118 serves to control a circuit which supplies a beep signal to the operator in control of the detonating operation, whereby the actual detonation can be synchronized with starting the recording apparatus in operation. Switch 117 is connected with a circuit arranged to insure transmission of at least four beep signals before starting a recording cycle. If the operator should attempt to start a record during the beep signal period, transmission is automatically delayed until the next revolution of the drum.

The electronics used with the apparatus described above preferably employs frequency modulation. Thus a carrier frequency of say 2700 c.p.s. is supplied by a plurality of oscillators to their respective modulators which in turn are connected to the signal sources, namely the "Geophones" or other devices employed. The resulting FM signals are then amplified and applied to the individual units of the magnetic head. For a reproducing operation the individual units of the magnetic head are connected to demodulating and amplifying means whereby signals are obtained having waveforms corresponding to the waveforms of the original signals. The demodulated amplified signals can be applied to various pieces of equipment, such as a recorder of the multi-channel mirror galvanometer or oscillator type.

Operation of the apparatus can be summarized as follows: After applying a magnetic strip in the manner previously described, the lever 57 is lowered to put the equipment in operation. The coordination between firing of a detonating charge and the rotation of the drum is such that the first signals from the detonation are received after the recess 91 has cleared the magnetic head. The drum rotates at a constant speed and the signals as received by the various units of the head produce separate parallel record tracks. Recordings are completed after the drum has rotated one revolution. Following a recording operation the recorded records can be reproduced by connecting the magnetic head to the reproducing electronics, and by similarly rotating the drum through one revolution. Record strips can be saved and reproduced at any time desired by applying them to the apparatus.

It will be evident that the apparatus can be modified in various ways within the scope of the appended claims. While in the foregoing description particular reference has been made to seismic recording, it will be evident that the equipment is applicable in general to transient recording where it is desired to record signal information over a relatively short operating cycle.

I claim:

1. In magnetic tape apparatus, a rotatable drum, said drum having a cylindrical peripheral surface adapted to accommodate a magnetic record strip and having a peripheral flange at one end of the drum, said flange having an outer diameter greater than that of the cylindrical surface, motive means for driving the drum, said peripheral surface being interrupted by a recess, means carried by the drum within said recess for releasably engaging one end portion of a magnetic record strip, said means including a pin carried by the drum and adapted to be accommodated within an opening provided in the corresponding end portion of the strip, said pin being movable laterally of the flange, together with spring means for yieldably urging the pin in a direction toward said flange whereby one edge of a tape strip engaged by said pin is caused to be urged against said flange, and means disposed within said recess for releasably engaging the other end portion of the strip, said last means including a pin adapted to be accommodated in an opening provided in the other end portion of the strip, together with spring means serving yieldably to urge said last named pin in a direction to tension the strip about the drum.

2. Apparatus as in claim 1 together with a manually operated member disposed within said recess, and means connecting said member to said second named pin whereby manual movement of said member serves to move said second named pin against said last named spring means to facilitate application of the strip to said second named pin.

3. In magnetic tape apparatus, a rotatable drum having a peripheral surface adapted to accommodate a magnetic strip, a magnetic head, means for movably supporting the head whereby it may either engage a magnetic strip wrapped about the drum in its operating position or be moved to a position in which it is spaced with respect to said strip, a rotatable driving capstan, means serving to mount said capstan whereby it can be shifted from a position in frictional engagement with the drum to another position in which it is in nondriving relation with respect to the drum, means forming a frictional brake for the drum, a manually operated control member movable to either one of three operating positions, and means operatively connecting said member to the magnetic head and the driving capstan and also to the friction brake, whereby for one position of the control member the capstan is in frictional engagement with the drum to drive the same, the head is disposed in engagement with the strip and the brake is released, and whereby for a second operating position of the control member the head is lifted out of engagement with the strip, the capstan is disengaged from the drum and the brake is applied to the drum, and whereby for the third operating position of the control member, the capstan is engaged with the drum to drive the same, the head is maintained out of contact with the strip and the brake is disengaged with respect to the drum.

References Cited in the file of this patent

UNITED STATES PATENTS

| | | |
|---|---|---|
| 860,046 | Meston | July 16, 1907 |
| 2,056,205 | O'Hara | Oct. 6, 1936 |
| 2,123,997 | Jirousek | July 19, 1938 |
| 2,411,881 | Janke | Dec. 3, 1946 |
| 2,653,819 | Roberts | Sept. 29, 1953 |
| 2,806,757 | Cunningham | Sept. 17, 1957 |

FOREIGN PATENTS

| | | |
|---|---|---|
| 179,918 | Germany | Dec. 20, 1906 |
| 704,152 | Great Britain | Feb. 17, 1954 |